United States Patent
Boccuzzi et al.

(10) Patent No.: US 6,370,157 B2
(45) Date of Patent: *Apr. 9, 2002

(54) AUTOMATIC FREQUENCY CONTROL FOR A CELLULAR BASE STATION

(75) Inventors: Joseph Boccuzzi, Brooklyn, NY (US); Winston Hong Lieu, Franklin Township, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/847,165

(22) Filed: Apr. 30, 1997

(51) Int. Cl.[7] .................................................. H04J 1/00
(52) U.S. Cl. .................................... 370/482; 455/161.1
(58) Field of Search ................................ 370/482, 335, 370/337, 319, 320, 321, 328, 342, 347; 455/161.1, 161.2, 161.3, 164.1

(56) References Cited

U.S. PATENT DOCUMENTS

| | | | | |
|---|---|---|---|---|
| 5,233,633 A | * | 8/1993 | Baum et al. | 375/97 |
| 5,369,790 A | * | 11/1994 | Yokota | 455/164.1 |
| 5,649,320 A | * | 7/1997 | Korhonen et al. | 455/196.1 |
| 5,802,477 A | * | 9/1998 | Mizokami et al. | 455/525 |
| 5,809,431 A | * | 9/1998 | Bustamante et al. | 455/562 |
| 5,825,763 A | * | 10/1998 | Kato et al. | 370/335 |
| 5,883,598 A | * | 3/1999 | Parl et al. | 342/457 |

* cited by examiner

Primary Examiner—Dang Ton
Assistant Examiner—Brian Nguyen
(74) Attorney, Agent, or Firm—Gibbons, Del Deo, Dolan Griffinger & Vecchione

(57) ABSTRACT

A method for automatic frequency control in a wireless communication network having public frequency channels comprises the steps of: scanning the public frequency channels; locking the cellular base station to a signal on one of the public frequency channels; and returning the cellular base station to normal operation.

2 Claims, 3 Drawing Sheets

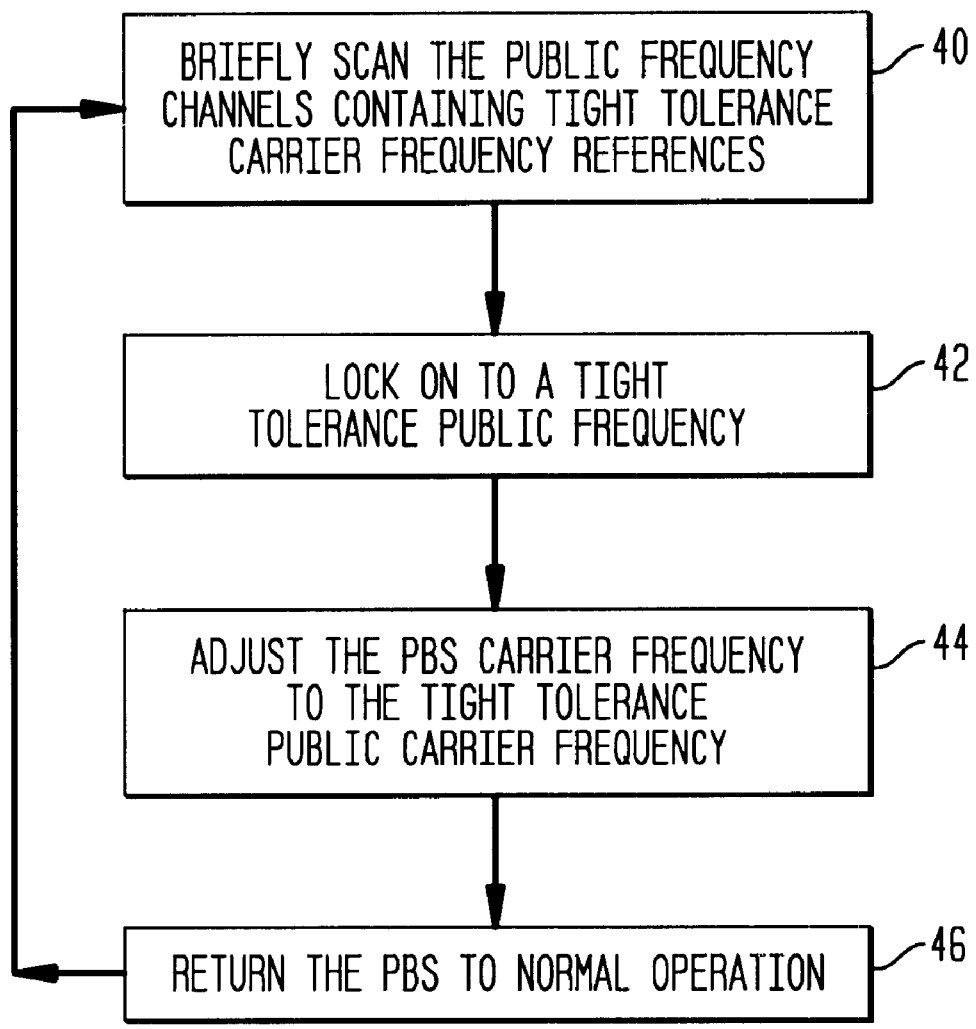

AUTOMATIC FREQUENCY CONTROL FOR A CELLULAR BASE STATION

FIELD OF THE INVENTION

This invention relates generally to wireless communications, and more particularly to automatic frequency control.

BACKGROUND OF THE INVENTION

Wireless access provides tetherless access to mobile users, this has been done principally to address the requirements of two specific and disjoint domains: voice telephony and indoor data LANs. Cellular telephone networks have extended the domain of telephone service over a wireless last hop, while mobile-IP LANs such as WaveLAN and RangeLAN do the same for indoor users of TCP/IP data networks. Advances with wireless technology and high-speed integrated service wired networking promises to provide mobile users with comprehensive multimedia information access in the near future.

Personal Communication Services (PCS) are a broad range of individualized telecommunication services which enable individuals or devices to communicate irrespective of where they are at anytime. Personal Communication Networks (PCN) are a new type of wireless telephone system communicating via low-power antennas. PCNs offer a digital wireless alternative to the traditional wired line.

As a cellular mobile radio moves from one cell to another, it is "handed" off to the next cell by a controller, which determines which cell is receiving the strongest signal. Because the cellular user remains closer to the base transceiver than in classical mobile communications, the cellular user's transceiver requires less power and is therefore less expensive. The great advantage of the cellular concept over non-cellular radio is that higher capacity is allowed with the same frequency allocation. This advantage comes at a cost, the necessity of a large number of cell sites and associated radio ports.

Cellular and PCS technologies that are based on Time Division Multiple Access (TDMA) and Frequency Division Multiple Access (FDMA) require accurate control of the carrier frequency. Typical cellular base stations use a 0.2 ppm tolerance carrier frequency crystal and mobile units use 2.5 ppm tolerance carrier frequency crystals. In a cellular base station the tighter tolerance is achieved through higher costs and larger size. The design of a PCS system requires smaller cells and subsequently more Personal Base Stations (PBS).

Therefore, there is a need for maintaining tight tolerance of carrier frequency at a lower cost.

SUMMARY OF THE INVENTION

In accordance with the present invention, there is provided in a wireless communication network having public frequency channels, a method for automatic frequency control for a cellular base station. The method comprising the steps of: scanning the public frequency channels; locking the cellular base station to a signal on one of the public frequency channels; and returning the cellular base station to normal operation.

BRIEF DESCRIPTION OF THE DRAWINGS

A more complete understanding of the present invention may be obtained from consideration of the following description in conjunction with the drawings in which:

FIG. 3 is a flow chart of the present invention automatic frequency control for a cellular base station.

DETAILED DESCRIPTION OF VARIOUS ILLUSTRATIVE EMBODIMENTS

Although the present invention is particularly well suited for use with Personal Communication Network (PCN) systems utilizing TDMA and shall be described with respect to this application, the methods and apparatus disclosed here can be applied to other cellular systems including indoor wireless systems as well as systems utilizing CDMA, NAMP and access systems.

Figure 1:
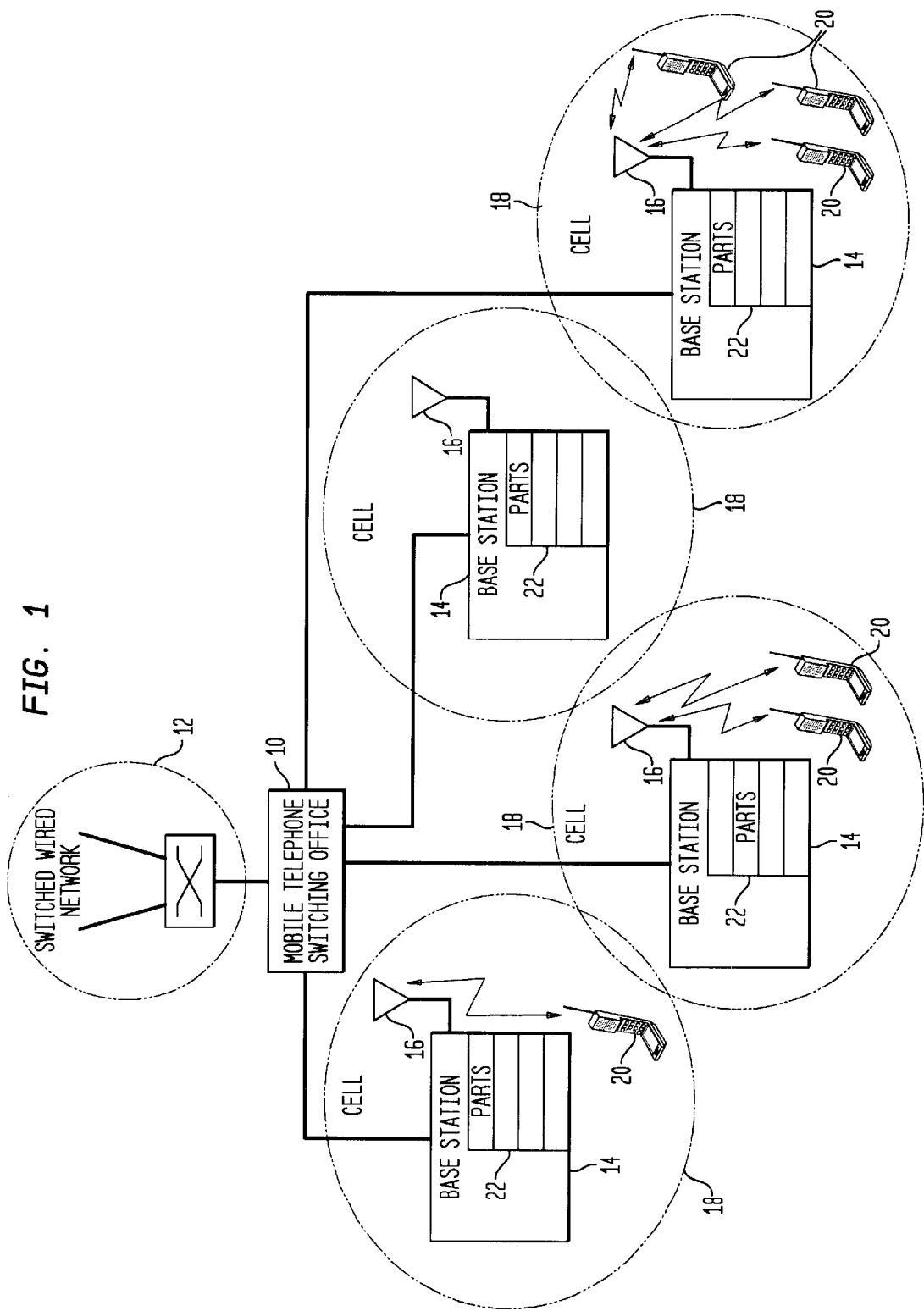
FIG. 1 is a block diagram of a wireless network employing the present invention.

Referring now to FIG. 1 there is shown a block diagram of a cellular wireless network. A Mobile Telephone Switching Office (MTSO) 10, also known as a Mobile Switching Center (MSC), provides for switching calls between the cellular network and the switched wired network 12. The MTSO 10 controls the entire operation of a cellular system, setting up and monitoring all cellular calls, and tracking the location of all cellular-equipped vehicles traveling in the system, arranging hand-offs, and providing billing information. The MTSO 10 is connected to a plurality of base stations 14 (public base stations). The cellular base station 14 is the fixed transceiver in the wireless network, which is coupled through a radio port to a cellular antenna 16. The typical cellular base station 14 consists of multiple radio transceiver ports 22. Radio transceiver ports 22 are assigned to a channel. The geographical area for which a cellular base station 14 acts as the gateway is called its cell (public cell) 18, the various cellular base station 14 nodes are distributed at suitable locations. A cellular mobile unit 20 communicates with a cellular base station 14 within a traditional cellular network cell 18 through an assigned channel pair consisting of an uplink frequency and a downlink frequency.

Figure 2:
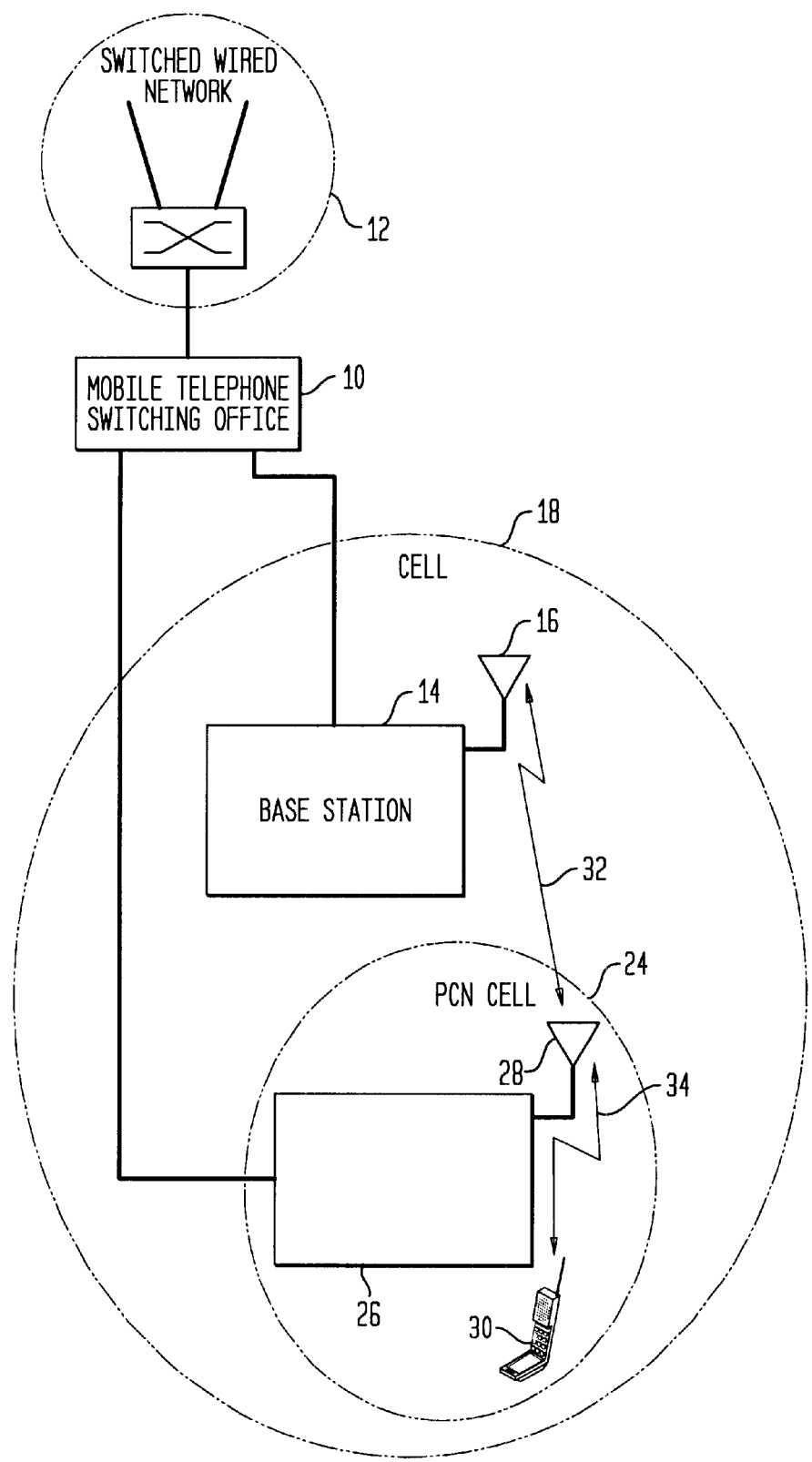
FIG. 2 is a block diagram of a PCN cell within a traditional cellular network cell employing the present invention.

Referring now to FIG. 2, there is shown a block diagram of a PCN cell within a traditional cellular network cell. Elements having similar functions to those described in FIG. 1 have been assigned the same numbers in FIG. 2. The public base station 14 is the fixed transceiver in the cellular wireless network, which is coupled through a radio port 22 to a cellular antenna 16. Within the public cell 18, which is the geographical area for the cellular base station 14 is a PCN cell 24. The PCN cell 24 is smaller than the public cell 18. Any public cell 18 may contain a plurality of PCN cells 24. The Personal Base Station (PBS) 26 is the fixed transceiver in the PCN wireless network, which is coupled through a radio port to a PBS cellular antenna 28. The PBS 26 has less power than the cellular base station 14. The geographical area for which a PBS 26 acts as the gateway is called its PCN cell 24, the various PBS 26 nodes are distributed at suitable locations. A PCN mobile unit 30 communicates with a PBS 26 within a PCN cell 24 through an assigned channel pair consisting of an uplink frequency and a downlink frequency which comprise a PCN wireless link 34.

Typical public base stations 14 use a 0.2 ppm tolerance carrier frequency crystal and mobile units use 2.5 ppm tolerance carrier frequency crystals as a carrier frequency reference. In the public base station 14 the tighter tolerance is achieved through higher costs and larger size. While a PBS 26 could utilize the tight tolerance carrier frequency crystals, the higher costs and size are contradictory to the concept of a PCN wireless network. However, the public cell 18 contains a public base station 14 which utilizes the tighter tolerance carrier frequency crystals. Furthermore, the PBS 26 is located within the public cell 18 and can access the public frequency channels of the public base station 14. By the PBS 26 periodically scanning the public frequency channels through a wireless link 32, the PBS can frequency lock its receiver to the public base station 14. Once the PBS 26 briefly locks on to the public base station 14, the PBS 26 returns to normal operation with a carrier frequency that has less offset from a theoretically desired frequency than the offset obtained from only utilizing the PBS reference. This results in tightening the PBS 26 carrier frequency tolerance without the requirement of the PBS 26 containing a tighter tolerance reference.

Referring to FIG. 3 there is shown a flow chart of the present invention automatic frequency control for a cellular base station. In step 40 the PBS briefly scans the public frequency channels containing tight tolerance carrier frequency references. Then the PBS locks on to a tight tolerance public frequency in step 42. This enables in step 44 the adjustment of the PBS carrier frequency to the tight tolerance public carrier frequency. After locking on to the tight tolerance public frequency the PBS returns to normal operation in step 46.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. In a wireless communication environment wherein a first base station for a first wireless communications system, is operated within a coverage area of a second base station for a second wireless communications system, and wherein signals transmitted from said second base station are maintained at a predetermined frequency tolerance, a method for automatic frequency control for signals generated by said first base station comprising the steps of:

causing a receiving device at said first base station to periodically scan said signals from said second base station;

locking the first base station to a frequency of one of said second base station signals;

adjusting a carrier frequency of said first base station to said locked second base station frequency;

returning the first base station to normal operation, wherein said normal operation is operation within said first wireless communication systems;

wherein the step of locking further comprises the step of deriving a carrier frequency reference from the locked second base station frequency; and further comprising the step of adjusting a carrier frequency of said first base station as a function of said derived carrier frequency reference.

2. In a wireless communication network having a base station transmitting signals on a set of frequency channels, wherein transmitted frequencies of said frequency channels are maintained within a predetermined frequency tolerance, a method for automatic frequency control of a personal base station operated within a coverage area of said network base station, the method comprising the steps of:

causing a receiving device at said personal base station to periodically scan said transmitted signals from said network base station;

locking the personal base station to a frequency of one of said network base station signals;

adjusting a carrier frequency of said personal base station to said locked network base station frequency;

returning the personal base station to normal operation, wherein said normal operation is operation within said set of frequency channels;

wherein the step of locking further comprises the step of deriving a carrier frequency reference from said frequency of said one of said network base station signals; and further comprising the step of adjusting a carrier frequency reference of the personal base station as a function of said derived carrier frequency reference.

* * * * *